US012421770B2

(12) United States Patent
Szegeny

(10) Patent No.: US 12,421,770 B2
(45) Date of Patent: Sep. 23, 2025

(54) MOTOR VEHICLE LOCK

(71) Applicant: KIEKERT AKTIENGESELLSCHAFT, Heiligenhaus (DE)

(72) Inventor: Peter Szegeny, Engelskirchen (DE)

(73) Assignee: Kiekert AG, Heiligenhaus (DE)

( * ) Notice: Subject to any disclaimer, the term of this patent is extended or adjusted under 35 U.S.C. 154(b) by 11 days.

(21) Appl. No.: 18/293,038

(22) PCT Filed: Aug. 19, 2022

(86) PCT No.: PCT/DE2022/100619
§ 371 (c)(1),
(2) Date: Jan. 29, 2024

(87) PCT Pub. No.: WO2023/036363
PCT Pub. Date: Mar. 16, 2023

(65) Prior Publication Data

US 2024/0247522 A1 Jul. 25, 2024

(30) Foreign Application Priority Data

Sep. 9, 2021 (DE) ..................... 10 2021 123 328.3

(51) Int. Cl.
*E05B 81/14* (2014.01)
*E05B 77/34* (2014.01)
(Continued)

(52) U.S. Cl.
CPC .............. *E05B 81/14* (2013.01); *E05B 77/34* (2013.01); *E05B 81/06* (2013.01); *E05B 81/34* (2013.01)

(58) Field of Classification Search
CPC .......... E05B 79/08; E05B 79/10; E05B 81/14; E05B 85/20
See application file for complete search history.

(56) References Cited

U.S. PATENT DOCUMENTS 5,678,869 A * 10/1997 Yoshikuwa ............. E05B 77/34 292/216
6,641,184 B2 * 11/2003 Erices ..................... E05B 81/82 292/201
(Continued)

FOREIGN PATENT DOCUMENTS

DE 3726907 C1 12/1988
DE 102007025365 A1 12/2007
(Continued)

OTHER PUBLICATIONS

International Search Report mailed Nov. 10, 2022, for priority International Application No. PCT/DE2022/100619.

*Primary Examiner* — Christine M Mills
(74) *Attorney, Agent, or Firm* — Renner, Otto, Boisselle & Sklar, LLP

(57) ABSTRACT

A motor vehicle lock—in particular, a motor vehicle door lock—having a locking mechanism which includes a rotary latch and a pawl—in particular, a single pawl—wherein the rotary latch is able to latch into at least one latch position by means of the pawl; a rotatable triggering lever, wherein the locking mechanism can be moved by means of the triggering lever from the at least one latch position into an open position; and an electromotive drive unit for actuating the triggering lever, and wherein the drive unit is formed at least by an electric motor and a transmission stage, and the transmission stage has an actuation lever, wherein the pawl, the triggering lever, and the actuation lever are accommodated in the motor vehicle lock so as to be able to pivot about the same axis of rotation, wherein at least the actuation lever and the triggering lever engage with one another via a complementarily designed connection geometry, such that a movement of the actuation lever can be transmitted to the triggering lever.

20 Claims, 5 Drawing Sheets

(51) Int. Cl.

| | |
|---|---|
| ***E05B 81/06*** | (2014.01) |
| ***E05B 81/34*** | (2014.01) |

(56) References Cited

U.S. PATENT DOCUMENTS

| | | | | |
|---|---|---|---|---|
| 2014/0284941 | A1* | 9/2014 | Wittelsbuerger | E05B 77/06 292/100 |
| 2020/0224463 | A1 | 7/2020 | Yokota | |

FOREIGN PATENT DOCUMENTS

| | | | | | |
|---|---|---|---|---|---|
| DE | 202013004025 | U1 | | 8/2014 | |
| DE | 202013004026 | U1 | * | 9/2014 | E05B 77/28 |
| DE | 102014003106 | A1 | | 9/2015 | |
| DE | 102015110639 | A1 | | 3/2016 | |
| DE | 202015106321 | U1 | | 2/2017 | |
| DE | 102019120842 | A1 | | 8/2020 | |
| DE | 102019109488 | A1 | | 10/2020 | |
| DE | 102019131179 | A1 | * | 5/2021 | E05B 79/08 |
| EP | 1158125 | A1 | * | 11/2001 | E05B 77/24 |
| EP | 2754799 | A1 | * | 7/2014 | E05B 77/34 |

* cited by examiner

I

MOTOR VEHICLE LOCK

This application is a national phase of International Application No. PCT/DE2022/100619 filed Aug. 19, 2022, which claims priority to German Patent Application No. 10 2021 123 328.3, filed Sep. 9, 2021, each of which is hereby incorporated herein by reference in its entirety.

FIELD OF DISCLOSURE

The invention concerns the field of vehicle locking systems, and relates to a motor vehicle lock—in particular, a motor vehicle door lock—having a locking mechanism with a rotary latch and an—in particular, single—pawl, wherein the rotary latch can be latched into at least one latch position by means of the pawl; a rotatable triggering lever, wherein the locking mechanism can be moved from the at least one latch position into an open position by means of the triggering lever; and an electromotive drive unit for actuating the triggering lever, and wherein the drive unit is formed at least by an electric motor and a transmission stage, and the transmission stage has an actuation lever for actuating the triggering lever.

BACKGROUND OF DISCLOSURE

A challenge in the field of motor vehicle locks is to further reduce the installation space requirement of the motor vehicle locks in the vehicle. In addition, the weight of the motor vehicle locks is to be reduced further.

Motor vehicle locks are known from the prior art which, with an electrical opening mechanism, can actuate the pawl out of a latch position in such a way that the locking mechanism of the motor vehicle lock can be opened/unlatched electrically. The opening kinematics required for this purpose with an electric drive made of an electric motor and a triggering lever usually require for this purpose an installation space in the motor vehicle lock which is not negligible, so that the required actuating forces can be transmitted from the electric motor to the triggering lever and from the triggering lever to the pawl. The triggering lever and the remaining actuating kinematics are often equipped with large levers, so that sufficient actuating forces can be achieved via lever arms. Furthermore, the components for the pawl, triggering lever, and remaining actuating kinematics have to be brought into operative connection with one another in the lock, wherein this is realized via numerous lever assemblies or cable drives.

DE 10 2015 110 639 A1 discloses a motor vehicle lock, wherein the motor vehicle lock has a locking mechanism with a rotary latch and at least one pawl, and also an electrical opening drive. The drive unit in this case consists of an electric motor and a triggering lever which acts upon the pawl via lever kinematics, so that the pawl can be moved out of the latch position via the triggering lever and the lever kinematics. It is disadvantageous in the arrangement disclosed there that the opening kinematics as a whole, and thus the arrangement of the triggering lever and the drive unit, take up a large installation space in the motor vehicle lock. For this purpose, the electric drive is designed with an electric motor and a transmission stage, wherein an actuation lever is arranged about a first axis of rotation in a first plane, and a triggering lever is arranged about a second axis, wherein the pawl is furthermore arranged so as to be rotatable about a third axis. This arrangement via numerous axes requires a corresponding installation space and is complicated to assemble.

SUMMARY OF DISCLOSURE

The object of the invention is to at least partially eliminate the disadvantages known from the prior art. In particular, the object of the present invention is to provide a motor vehicle lock that has a particularly compact design and can nevertheless provide sufficient actuating forces, so that simple and quiet opening of the locking mechanism is enabled.

According to the invention, this object is achieved by a motor vehicle lock—in particular, a motor vehicle door lock—according to claim 1.

Further advantageous embodiments are specified in particular in the dependent claims and in the description. It should be pointed out that the features listed in the claims can be combined with one another in any technologically sensible manner and show further embodiments of the invention.

The motor vehicle lock according to claim 1 has a locking mechanism with a rotary latch and an—in particular, single—pawl, wherein the rotary latch can be latched into at least one latch position by means of the pawl. In addition, the motor vehicle lock has a triggering lever, wherein the locking mechanism can be moved from the at least one latch position into an open position by means of the triggering lever. Furthermore, an electric drive unit for actuating the triggering lever is provided, wherein the drive unit is formed at least from an electric motor and a transmission stage, and the transmission stage has an actuation lever.

According to the invention, it is proposed, to achieve the object, that the pawl and the triggering lever, as well as the actuation lever, be pivotably accommodated in the motor vehicle lock about the same, single axis of rotation, wherein at least the actuation lever and the triggering lever interlock by means of a complementarily designed connection geometry, so that a movement of the actuation lever can be transmitted to the triggering lever. According to the invention, it is thus provided that the pawl, the triggering lever, and the actuation lever have the same axis of rotation and be accommodated in the motor vehicle lock so as to be pivotable about this axis of rotation. In particular, the pawl, the triggering lever, and/or the actuation lever are fastened at least to one lock body. The actuation lever and at least the triggering lever have a complementarily designed connection geometry which enables a positive and/or non-positive fit of the at least two aforementioned components. These complementarily designed connection geometries can engage in one another and, in particular, transmit from the actuation lever to the triggering lever a rotational movement which is transmitted from the drive unit to the actuation lever, so that the triggering lever can move the pawl out of the at least one latch position—in particular, a main latch position and/or pre-latch position. The connection geometry according to the invention can also be understood as a plug connection (for example, a plug-in axle connection). Consequently, at least the actuation lever and the triggering lever can be assembled/plugged together. This enables a compact design, and ensures the force transmission—in particular, for opening the locking mechanism.

The connection geometry designed in a complementary manner according to the invention is preferably designed as a toothing, wherein the toothing can have one or more teeth or tooth-like geometries. The actuation lever or the triggering lever can thus preferably have an external toothing, and the corresponding other component can have an internal toothing, or vice versa. According to the invention, the negative shape of the first connection geometry of the actuation lever or of the triggering lever corresponds to the geometry that is designed to be complementary thereto. In visual terms, it could be designed in such a way that the negative shape of the flanks of an external toothing of the one connection geometry corresponds in principle to the flank shape of the internally toothed component, and thus to the connection geometry of the further component. It is thus conceivable that the triggering lever have an external toothing and the actuation lever have an internal toothing, or vice versa, and these toothings mesh—in particular, be plugged together.

The advantage of this complementarily designed connection geometry and the shared mounting of the pawl, the triggering lever, and the actuation lever about the same axis of rotation is that at least the three components—pawl, triggering lever, and actuation lever—can be arranged in a particularly compact manner in the motor vehicle lock. According to the invention, it is thus provided that the pawl, the triggering lever, and the actuation lever engage with one another at least in regions, and—in particular, in the region of the shared axis of rotation—the three components be arranged so as to be nested with one another in a certain way. The required installation space depth in the motor vehicle lock is thus significantly reduced. An actuating mechanism arranged at an angle to itself for releasing the pawl from the rotary latch is thus not absolutely necessary. It is also possible according to the invention to dispense with cable constructions that negatively affect installation space. Rather, the drive unit and the actuating mechanism consisting of the actuation lever, triggering lever, and connection to the locking mechanism—in particular, the pawl—can be designed to be particularly compact.

Advantageously, the at least one connection geometry can have a complete/circumferential toothing in the region of the axis, wherein the toothing has between one and ten teeth, preferably between 14 and 18, and particularly preferably 16 teeth, wherein the teeth interact with correspondingly substantially complementarily designed recesses. An internal or external toothing is thus provided on the actuation lever and/or triggering lever. A so-called poka-yoke connection can, particularly advantageously, be provided, so that a particularly simple and secure assembly can be carried out. Accordingly, at least one toothing geometry/one tooth can be designed differently from the remaining teeth/toothing geometries, wherein a recess formed in a complementary manner to the corresponding tooth/geometry is likewise designed differently in the component to be connected. Consequently, it is conceivable that, in particular, one connection geometry/one tooth be designed differently from the remaining teeth, and the associated recess on the component to be connected be likewise designed differently and complementarily to the one different tooth/geometry.

For example, it is conceivable that the triggering lever have a tooth with a wider tooth surface, and the actuation lever have a single larger, wider recess into which the one wider toothing can be arranged on the actuation lever. Incorrect assembly is thus virtually impossible.

Furthermore, it can be provided that the actuation lever or the triggering lever in the region of the axis of rotation have a collar which extends circumferentially at least in portions. Particularly preferably, the collar is designed such that the connection geometry—in particular, the toothing—is covered at least in portions, at least for the actuating and triggering levers engaged with each other. This circumferential collar makes it possible, on the one hand, to optimize the compact design further, and, furthermore, the collar can form a mount point for a spring, so that the actuation lever and/or the triggering lever can be preloaded by means of the spring. The spring can thus also be arranged in a compact manner on the triggering lever and/or actuation lever, and does not unnecessarily require further installation space.

Furthermore, the collar can cover the connection geometry—in particular, toothing—in such a way that the penetration of dirt and/or moisture can be reduced. Furthermore, it is conceivable that the triggering lever have an external toothing which extends from a first side of a substantially plate-shaped connection portion in a first direction, wherein a mounting point for a bearing pin of the pawl is formed on the other (opposite) side of the connection portion, wherein in particular the mounting point is designed as a receptacle in the triggering lever.

Advantageously, the triggering lever has an external toothing which interacts with an internal toothing of the actuation lever. According to the invention, however, it is also conceivable that the triggering lever have an internal toothing and the actuation lever have an external toothing which is designed to be correspondingly complementary. Accordingly, the triggering lever can also be designed as described above for the actuation lever.

The triggering lever advantageously has a substantially plate-shaped connection portion—in particular, in the region of the mounting points—wherein the toothing—in particular, external toothing—extends from the plate-like connection portion. On the opposite side of the toothing—in particular, external toothing—a connection point/mounting point for a bearing pin of the pawl is formed on the triggering lever. This bearing pin serves to mount the pawl on the lock housing of the motor vehicle lock. The mounting point is in particular also designed as a receptacle in the triggering lever. The pawl and the triggering lever can thus be arranged together on the bearing pin of the pawl. The compact design is thereby further improved.

Thus, according to the preferred embodiment, the bearing pin accommodates the pawl and the triggering lever, and the triggering lever and the actuation lever engage with one another in the manner according to the invention. A shared, compact mounting of these three components can thus be achieved.

Furthermore, it may be preferred for the triggering lever to have an—in particular, single—triggering arm which can be brought into engagement with the pawl. This triggering arm extends in particular from the substantially plate-shaped connection portion, such that a lever arm is formed for actuating the pawl. Consequently, it can advantageously be provided that the,—in particular, single—triggering arm extend radially from the connection portion.

The terms, axial and radial, are in particular related to the axis of rotation of the pawl, the triggering lever, and the actuation lever, so that the expression, axial, denotes in particular a direction which runs parallel to or coaxially with the axis of rotation. Furthermore, the expression, radial, specifically denotes a direction which runs perpendicular to the axis of rotation. A radial extension is to be understood in particular as an extension along or parallel to a radial direction, and an axial extension is to be understood in particular as an extension along or parallel to an axial direction.

Furthermore, it can advantageously be provided that the triggering lever have a pawl holder. The pawl holder can be a recess into which at least a portion of the pawl can be arranged. It is particularly preferred if the pawl holder is arranged in the region of the triggering arm of the triggering lever. The pawl holder can, for example, be designed as a pocket into which at least the pawl can be arranged in portions. A force can thus be transmitted from the triggering lever to the pawl particularly reliably. Furthermore, the compact geometry is further optimized thereby, and therefore the pawl can be arranged or is arranged at least in portions in the triggering lever.

Particularly advantageously, the pawl holder can be designed such that the pawl is arranged in the pawl holder with a positive and/or non-positive fit, at least in portions.

Particularly advantageously, the pawl holder can have a clip, latching, crimp, or snap connection for the pawl—in particular, a pawl arm. Thus, not only is the assembly simplified, but also a secure reception of the pawl in the triggering lever is enabled, wherein the compact structure is not negatively affected.

Particularly preferably, the pawl has at least two pawl arms, wherein at least one first pawl arm has a latch surface for latching with the rotary latch, and wherein a second pawl arm is arranged at least in portions in or on the triggering lever, wherein in particular the two pawl arms extend radially from the axis of rotation in substantially opposite directions. For the compact design and the simple and easy actuation, i.e., easy opening of the locking mechanism, it is sufficient if the pawl has only two pawl arms, wherein the first pawl arm is provided for latching with the rotary latch, and the second pawl arm is arranged at least in portions in the triggering lever as described above, so that the pawl is designed to be compact.

In particular, the second pawl arm is arranged in the motor vehicle lock in a manner overlapping the geometry of the triggering arm and an actuating arm of the actuation lever. According to the invention, it is thus possible for only the pawl arm to extend in the opposite direction to the second pawl arm, for the purpose of latching with the rotary latch. The second pawl arm, the triggering arm, and an actuating arm of the actuation lever each extend in the same direction, opposite thereto.

In order to further optimize the compact design, it is conceivable according to the invention that the actuation lever—in particular, an actuating arm of the actuation lever—surround and/or cover the transmission stage—in particular, a gear wheel of the transmission stage—at least in portions. For this purpose, it can be provided that the actuation lever be designed to be substantially U-shaped or curved, and that the actuation lever encompass the transmission stage—in particular, a gear wheel of the transmission stage. This means that the actuating arm or actuation lever substantially has a shape wherein the two end points of the lever or arm are each arranged on one side of the gear wheel. Accordingly, this embodiment allows the actuation lever and the transmission stage to be designed in a particularly compact manner, since an overlap at least in portions ensures that installation space is not unnecessarily wasted.

It can particularly advantageously be provided that at least one seal be arranged between the actuation lever and the triggering lever and/or between the triggering lever and the pawl, wherein in particular the seal is designed as a sealing ring. In this way, environmental influences—in particular, dust and/or water—penetrating into the region of the actuation lever, triggering lever, or pawl can be at least reduced.

It can particularly advantageously be provided that the actuation lever and the drive unit, i.e., including the transmission stage, be arranged in a first part of the motor vehicle lock housing, wherein the triggering lever, the pawl, and the rest of the locking mechanism are arranged in a further part of the motor vehicle lock that differs therefrom. It is thus conceivable that the drive unit with the transmission stage and the actuation lever—preferably also a lock electronics and/or power supply—be arranged at least in portions in a dry space of the motor vehicle lock housing, and the locking mechanism and—at least in portions—the triggering lever be arranged in a wet space of the motor vehicle lock. It is particularly preferred that a previously explained seal be provided between the individual components, triggering lever, actuation lever, and pawl. It can thus be achieved that a sealing/sealed connection can be achieved between the different lock housing parts and the connection of the components, pawl, triggering lever, and actuation lever.

In order to ensure a design of the motor vehicle lock that is as compact as possible, it can be particularly advantageous if the locking mechanism, at least having a pawl and rotary latch, be able to be unlatched in a particularly simple manner, i.e., be designed to be easy to open, or to open with little force. According to the invention, it can be provided that the rotary latch have a blocking element movably mounted on the rotary latch, wherein the blocking element is arranged so as to be rotatable at least in portions in the rotary latch and/or on the lock housing or the lock cartridge. The blocking element can accordingly—in particular, at least in portions—roll on the rotary latch and/or the pawl. This particularly advantageous locking mechanism makes it possible for the actuating forces to lift the pawl from the at least one latch position, i.e., main latch and/or pre-latching position. The pawl is thereby acted upon by a triggering force applied by the triggering lever, such that the blocking element first moves or rolls in the rotary latch in such a way that particularly low opening forces are required. The lever of the actuating kinematics can thus also be designed to be smaller, and thus have a compact design.

Where reference is made in the context of the invention to a lock for a motor vehicle, all locking systems which fix a movable part in a position relative to the motor vehicle are thus included. A lock can be arranged, for example, in a side door, a sliding door, a rear door, a cover, and also, for example, in a rear seat bench. This is true as well wherever movable parts are used by means of a locking system consisting of a locking mechanism with at least a pawl and a rotary latch. A lock according to the invention can be arranged in the movable part (side door, sliding door, rear door, cover, rear seat bench) or in/on the vehicle/vehicle body.

BRIEF DESCRIPTION OF DRAWINGS

Further measures improving the invention emerge from the following description of some exemplary embodiments of the invention, which are shown schematically in the figures. All of the features and/or advantages resulting from the claims, the description, or the drawing, including structural details, spatial arrangements, and method steps, may be essential to the invention both on their own and in the most varied of combinations. It should be noted that the figures are only of a descriptive character and are not intended to restrict the invention in any way.

In the figures, the same reference symbols denote the same or functionally identical components, unless stated otherwise.

In the drawings:

Figure 1A:
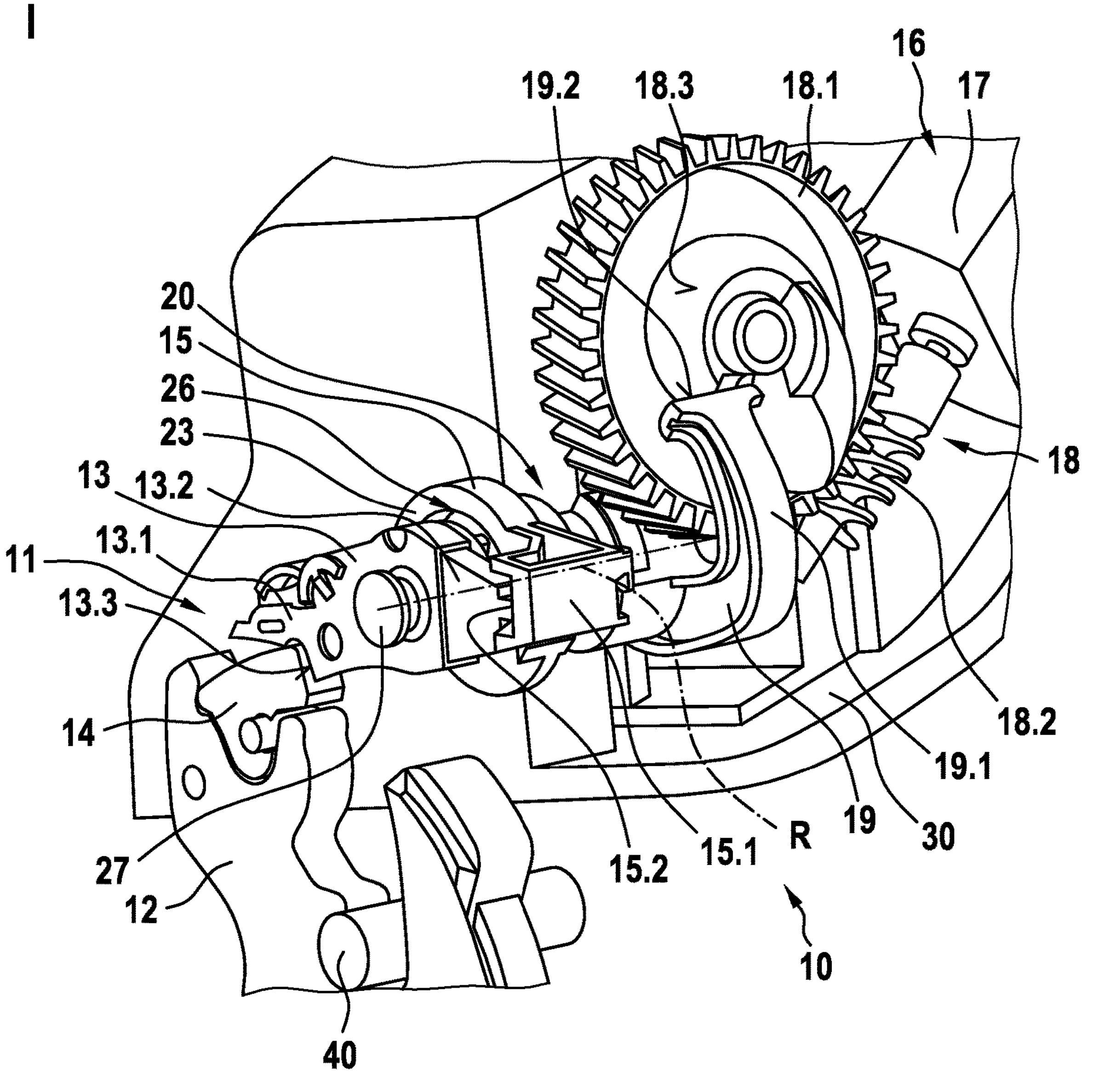
Figure 1B:
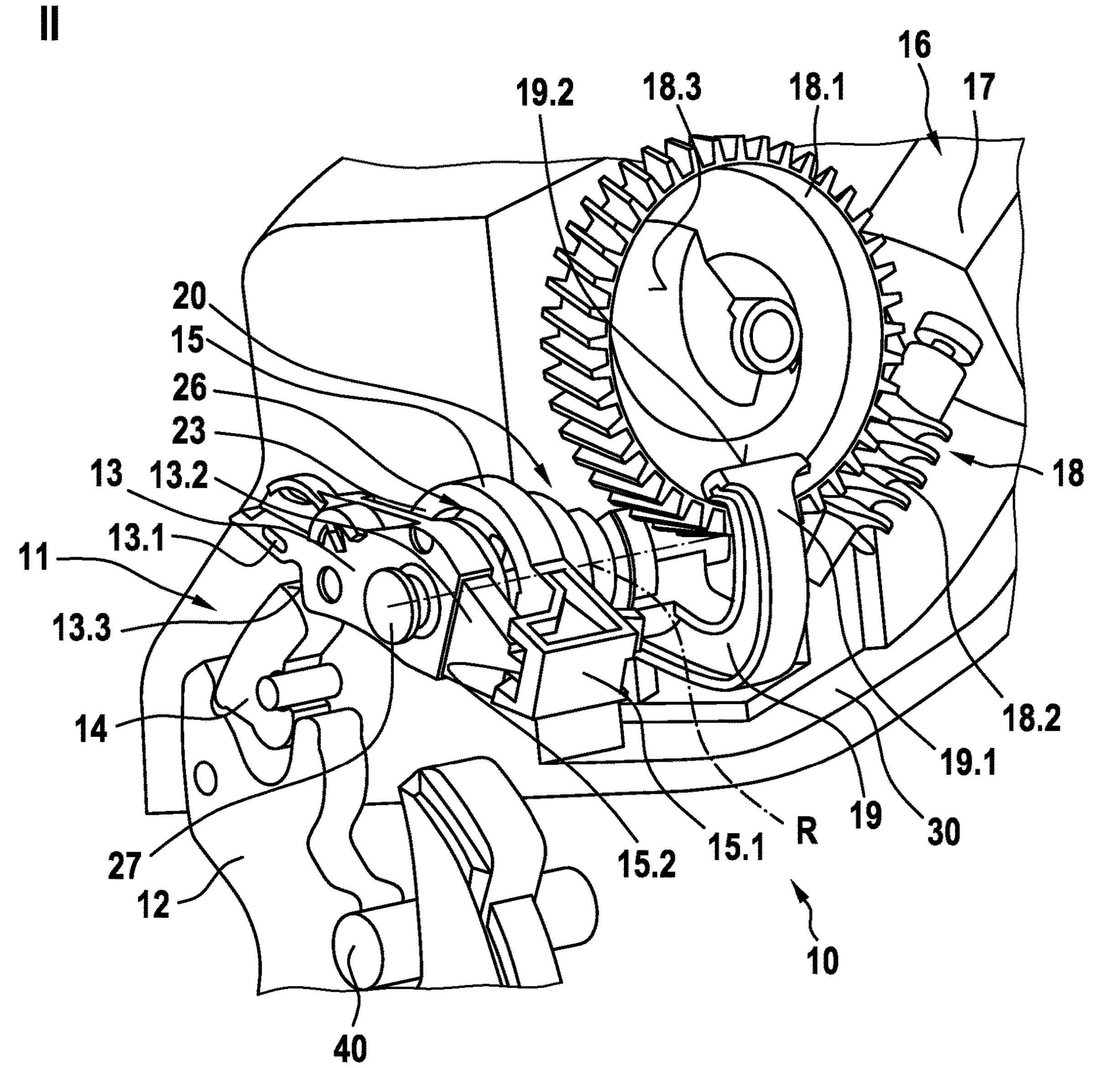
Figure 2A:
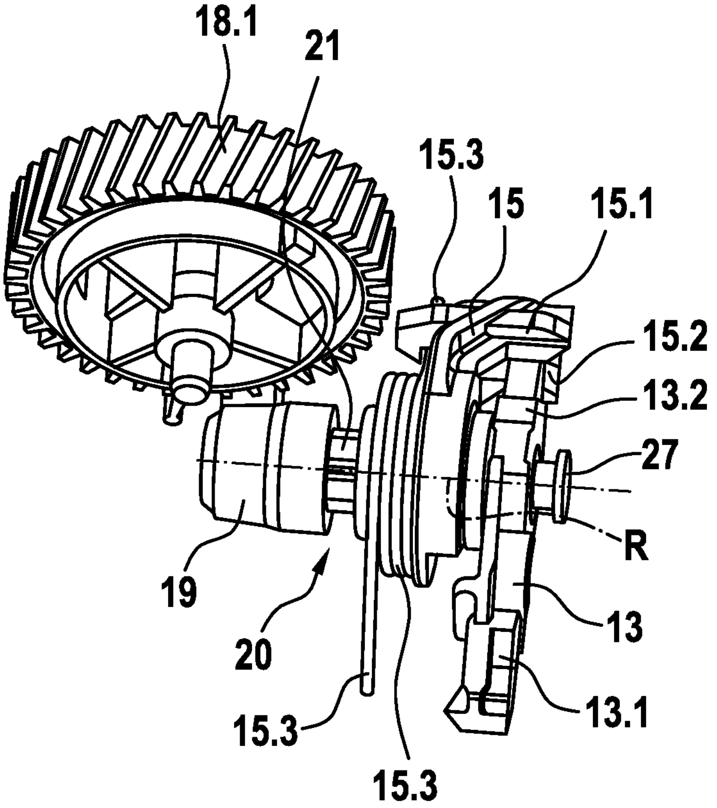
Figure 2B:
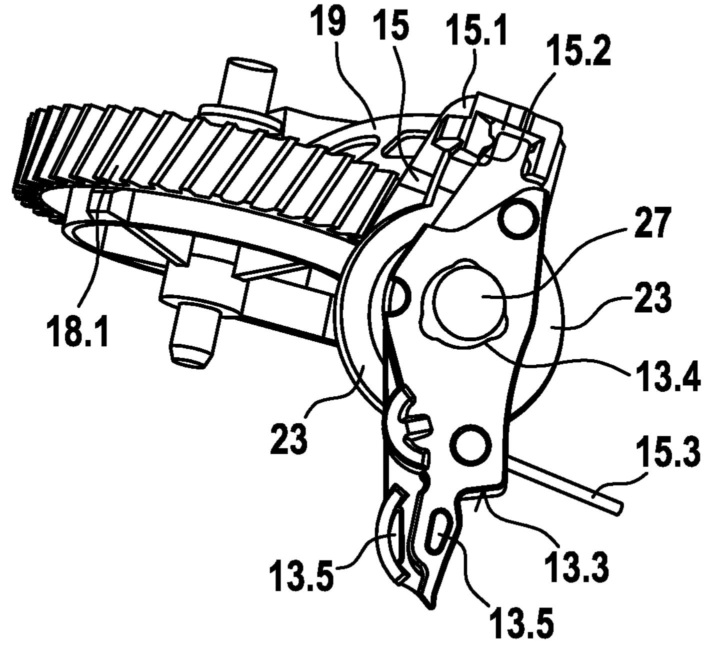
Figure 3A:
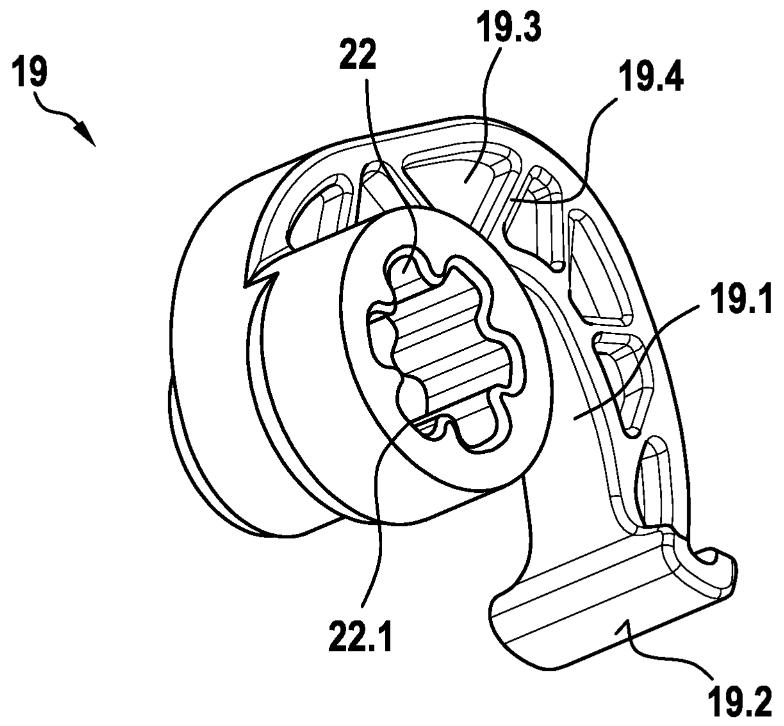
Figure 3B:
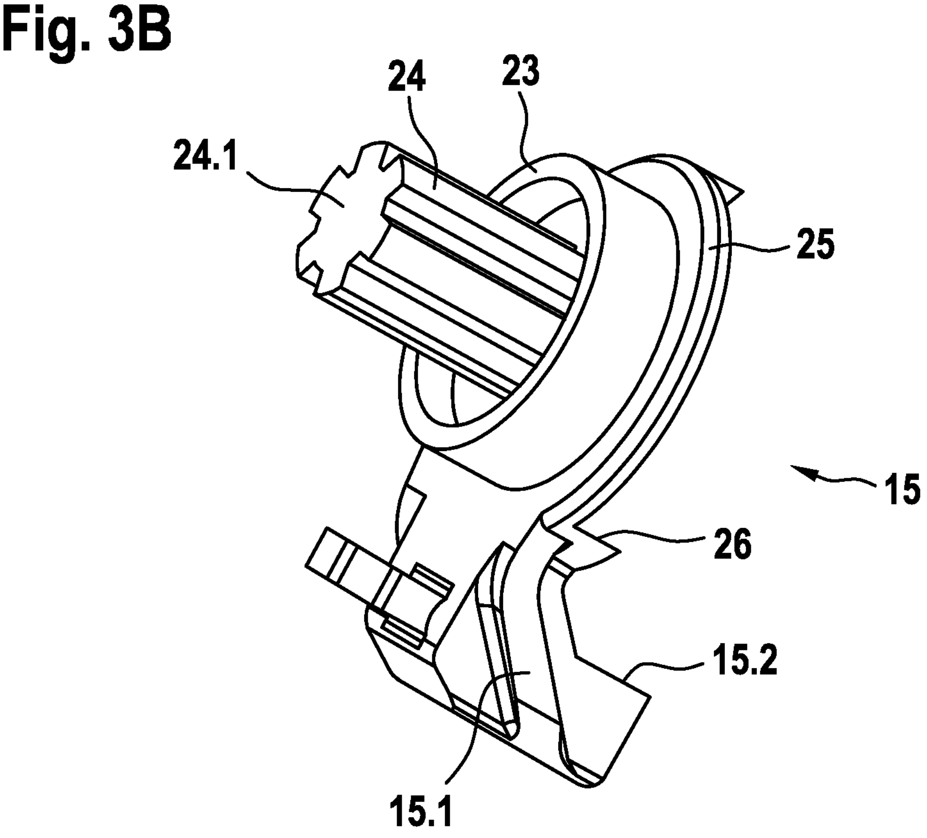
Figure 3C:
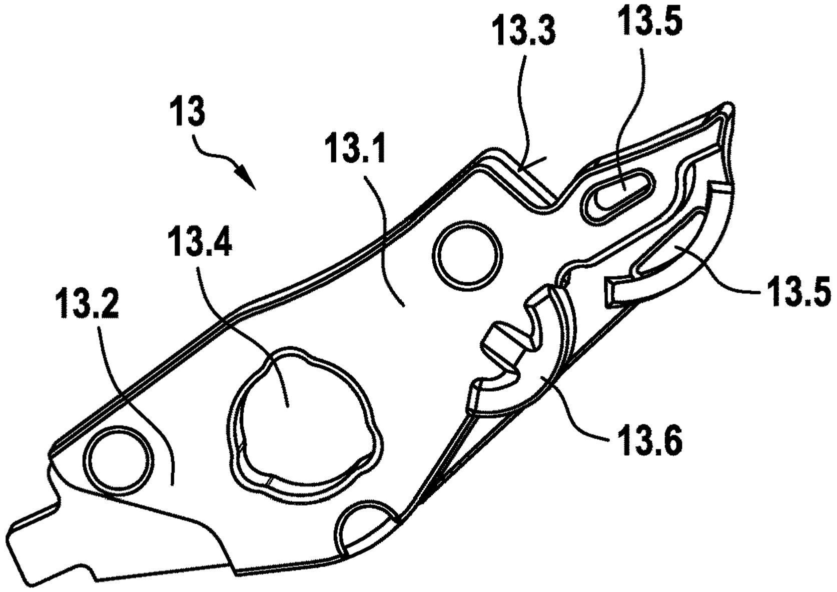
Figure 4:
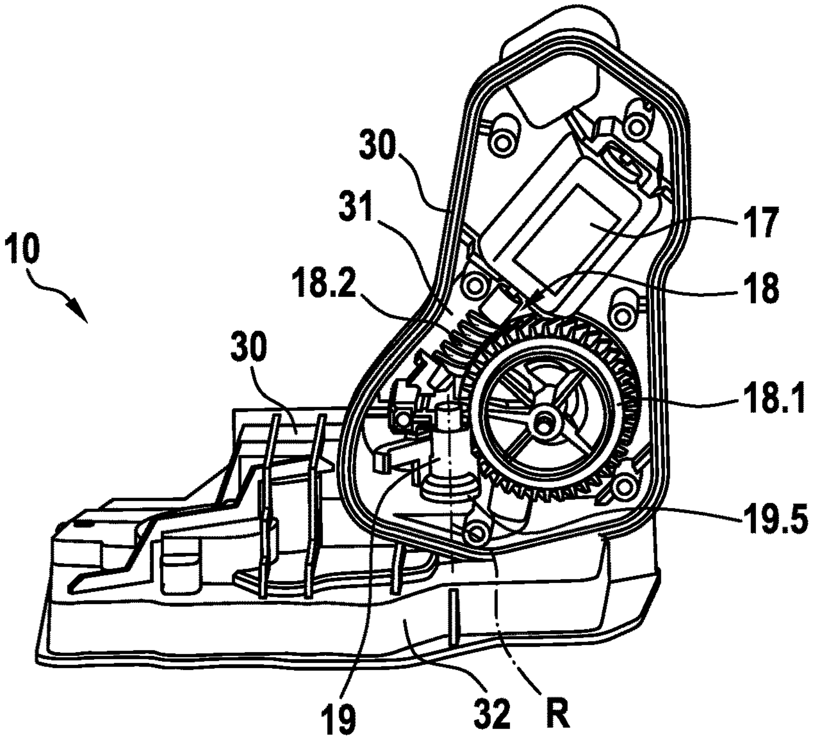

FIG. 1A schematically shows a cutout of an embodiment according to the invention of a motor vehicle lock in a latch position, FIG. 1B schematically shows a cutout of an embodiment according to the invention of a motor vehicle lock in an open position, FIG. 2A schematically shows a cutout of an embodiment according to the invention of a motor vehicle lock from a second perspective, FIG. 2B schematically shows a cutout of an embodiment according to the invention of a motor vehicle lock from a third perspective, FIG. 3A schematically shows the actuation lever of an embodiment according to the invention of a motor vehicle lock, FIG. 3B schematically shows the triggering lever of an embodiment according to the invention of a motor vehicle lock, FIG. 3C schematically shows the pawl of an embodiment of a motor vehicle lock according to the invention, and FIG. 4 schematically shows an embodiment according to the invention of a motor vehicle lock with a wet and dry space.

DETAILED DESCRIPTION

FIG. 1A shows a possible embodiment of a motor vehicle lock 10 according to the invention, having a lock housing 30, which is shown here only in part, and further having a locking mechanism 11 comprising a pawl 13 for the purpose of moving the rotary latch 12 in at least one latch position I—in particular, a main latch position I and/or a pre-latch position. In the latch position I, a lock holder 40 is fixed by the rotary latch 12 in such a way that a movable part of a vehicle, e.g., a motor vehicle door, is held in a closed position and is blocked against unintentional opening. For this purpose, the pawl 13 has a latch surface 13.3 which in the latch position I is in engagement with a blocking element 14 of the rotary latch 12, and thus blocks the rotary latch 12 against movement in the opening direction. The blocking element 14 is movably—in particular, pivotably—mounted in the rotary latch 12 and/or a lock plate/lock housing (as illustrated by a combination of FIGS. 1A and 1B). Furthermore, the pawl 13—in particular, the latch surface 13.3—is designed in such a manner or has a geometry such that the pawl 13 has a closing tendency. According to the invention, a neutral design can also be provided. If there is a closing tendency, the pawl 13—in particular, the latch surface 13.3—is geometrically designed such that the pawl 13 cannot be pushed out/unblocked independently—in particular, due to a pressure of the rotary latch 12—in the opening direction. The force exerted by the rotary latch 12 on the pawl 13 thus runs past the pawl axis in such a way that no opening torque is generated; rather, the pawl 13 is pushed towards the rotary latch 12.

The pawl 13 is rotatable about the axis of rotation R, wherein the pawl 13 is arranged/mounted on a bearing pin 27 for this purpose. In the exemplary embodiment shown, the pawl 13 has a first pawl arm 13.1 and a second pawl arm 13.2. In the embodiment shown, the first pawl arm 13.1 and the second pawl arm 13.2 extend, in the shown exemplary embodiment, from diametrically opposite directions, from the axis of rotation R and/or the bearing pin 27. The latch surface 13.3 for latching with the blocking element 14 and thus the rotary latch 12 is arranged on the first pawl arm 13.1. The pawl 13 is arranged on the triggering lever 15 on the second pawl arm 13.2. For this purpose, a pawl holder 15.2 is formed in the triggering lever 15, in which pawl holder the second pawl arm 13.2 is arranged, and in particular held, with a positive and/or non-positive fit.

The triggering lever 15 is also mounted rotatably on the same axis of rotation R as the pawl 13. This also applies to the actuation lever 19, which is also arranged so as to be rotatable about the axis of rotation R. The triggering lever 15 and actuation lever 19 have a connection geometry 20 according to the invention.

The motor vehicle lock 10 also has an electromotive drive unit 16, comprising an electric motor 17 and at least one transmission stage 18. The electromotive drive unit 16 serves to open the locking mechanism 11—in particular, to lift the pawl 13 by means of the triggering lever 15—with the actuation lever 19 interposed.

For the electromotive opening of the locking mechanism 11, the electric motor 17 drives a worm on the output shaft of the electric motor 17, wherein the worm works by means of a toothing on a gear/worm wheel 18.1 and drives the latter in a rotary manner. In the figures, the gear wheel 18.1 is designed as an spur-toothed worm wheel 18.1. According to the invention, an evoloid toothing is also conceivable. A substantially ramp-shaped (worm) contour 18.3 is formed on the worm gear 18.1 about its axis of rotation, with which contour the contact surface 19.2 of the actuation lever 19 comes into contact, and rotates it about the axis of rotation R. The contact surface 19.2 of the actuation lever 19 consequently travels along the contour 18.3 when the worm gear 18.1 rotates, whereby the actuation lever 19 rotates about the axis of rotation R. According to the invention, the actuation lever 19 and the triggering lever 15 have a complementarily designed connection geometry 20, so that a movement of the actuation lever 19 is transmitted to the triggering lever 15. The electromotive rotational movement of the actuation lever 19 is thus transmitted to the triggering lever so that the triggering lever 15 is moved about the shared axis of rotation R of the actuation lever 19, triggering lever 15, and pawl 13.

In order to open the locking mechanism 11—in particular, to lift the pawl 13—the in particular rotational movement of the triggering lever 15 is transmitted to the pawl 13 due to the arrangement of the pawl 13 in/on a triggering arm 15.1 of the triggering lever 15, so that it can be lifted off the rotary latch 12. The triggering arm 15.1 of the triggering lever 15 has a pawl holder 15.2 in which the second pawl arm 13.2 is arranged so that the pawl 13 can be rotated about the axis of rotation R/the bearing pin 27.

FIG. 1B shows the motor vehicle lock in an open position II in which the pawl 13 is lifted from the rotary latch 12, and consequently the latch surface 13.3 of the pawl 13 is no longer in blocking engagement with the blocking element 14 of the rotary latch 12. Based upon the fact that the pawl 13 has a closing tendency, as shown in FIG. 1A, the pawl 13 is lifted from the drive unit 16, the actuation lever 19, and the triggering lever 15 by the rotary latch 12 via the described actuating mechanism. Due to its mounting, the blocking element 14 accordingly moves at least in portions along with it, and is thus also lifted from the rotary latch 12 at least in the region of the latch surface of the rotary latch 12. As a result of this movement, an opening tendency can now be realized from the closing tendency, so that the pawl 13 is pushed further towards the open position II due to the force acting upon the pawl from the rotary latch 12, and an opening/unlocking of the locking mechanism 11 is supported/facilitated. As a result, the triggering forces for opening/unlocking the locking mechanism 11 are also reduced overall.

FIG. 1B now shows the deflected blocking element 14. The blocking element 14 is mounted in the rotary latch 12 and, preferably, additionally on a lock housing. For this purpose, a bolt shown in FIGS. 1A and 1B can be provided, which can also be mounted in the lock housing.

FIGS. 1A and 1B clearly show the compact design of a motor vehicle lock that is possible with the invention. For this purpose, the pawl 13 and the triggering lever 15 and the actuation lever 19 are accommodated in the motor vehicle lock 10 so as to be pivotable about the same axis of rotation R, wherein at least the actuation lever 19 and the triggering lever 15 engage into one another by means of a complementarily designed connection geometry 20, so that a movement of the actuation lever 19 on the triggering lever 15 can be transmitted to open/unlock the locking mechanism 11. In the embodiment shown, the triggering lever 15 is arranged between the pawl 13 and the actuation lever 19 on the axis of rotation R. The pawl 13, triggering lever 15, and actuation lever 19 are in a further sense nested with one another, or are plugged together at least in portions.

In other words, the pawl 13, triggering lever 15, and actuation lever 19 are connected to one another by means of at least one, and preferably several, plug connections and/or connection geometries 20. Particularly advantageously, the pawl 13 is, in the manner described, meshed with the triggering lever 15 by means of the plug connection made of the pawl arm 13.2 and pawl holder 15.2, and the triggering lever 15 meshes by means of the connection geometry 20 described further below. In particular, this embodiment enables the compact design.

Further improvements can be achieved by the mounting point 26 for the pawl 13—in particular, the bearing pin 27 of the pawl 13 on the triggering lever 15. The mounting point 26 can be designed as a recess or depression, so that the bearing pin 27 and/or, at least in portions, the pawl 13 can be arranged in/on the triggering lever 15. In FIG. 1B, a collar 23 is formed on the triggering lever 15, which collar can also contribute to the mounting point 26 and/or the bearing of the pawl 13 on the bearing pin 27 being protected from external environmental influences, or to giving the triggering lever 15 more mechanical stability overall.

FIGS. 2A and 2B show the actuating mechanism and the pawl 13 in a further perspective. In FIG. 2A, the connection geometry 20 of the triggering lever 15 and actuation lever 19 can be clearly seen. Overall, FIG. 2A shows the nested/plugged-together design of the components 13, 15, and 19 on the same axis of rotation R. It can be seen that the compact design can also be improved in that the gear wheel/worm wheel 18.1 can be arranged parallel to the axis of rotation R at least in portions, so that the required installation space in the direction of the axis of rotation R can be further reduced.

The connection geometry 20 in FIG. 2A has a toothing 21 on the triggering lever 15, which toothing is arranged/plugged into a recess, which is designed to be correspondingly complementary thereto, on the actuation lever 19. According to the invention, the toothing can also be formed on the actuation lever 19, and the recess can be formed in the triggering lever. In any case, the triggering lever 15 and actuation lever 19 can mesh together due to the complementarily designed connection geometry 20, so that a movement of the actuation lever 19 can be transmitted to the triggering lever 15. According to the embodiment shown, the bearing pin 27, the pawl 13, the triggering lever 15, a triggering lever spring 15.3, and the actuation lever 19 are arranged along the axis of rotation R. In this case, the components 27, 13, 15, 15.3, and 19 are at least partially nested or plugged together, whereby a compact design is made possible.

The triggering lever spring 15.3 can preload the triggering lever in such a way that it is acted upon in the opening direction or in the closing direction. The spring force can thus act upon the triggering lever 15 and, due to the connection of the triggering lever 15 and the pawl 13, exert force in the direction of the rotary latch 12/latch position I or away from the rotary latch in the direction of the open position. The triggering lever 15 and thus the pawl 13 are preferably loaded in the direction of the latch position, and thus facilitate the drop of the pawl 13 into the latch position of the rotary latch 12. For this purpose, one leg of the triggering lever spring 15.3 can, on the one hand, rest against the triggering lever 15, and, on the other, against the lock housing or a lock case. The triggering lever spring 15.3 and the triggering lever 15 are designed in such a way that the triggering lever spring 15.3 is mounted on the triggering lever, and the legs of the triggering lever spring 15.3 designed as a double leg spring can be supported on the triggering lever and on the lock housing or lock case. One leg of the spring 15.3 engages in a receptacle on the triggering arm 15.1 of the triggering lever 15. The windings of the triggering lever spring 15.3 are consequently arranged on the triggering lever 15 in such a way that the installation space can be kept compact. For this purpose, the triggering lever 15 can preferably have a spring seat on which the triggering lever spring 15.3—in particular, the windings—are mounted.

As can be seen in FIG. 2A, in the exemplary embodiment shown, the triggering lever 15 is designed with a triggering arm 15.1, wherein the triggering arm 15.1 is angled. In FIG. 2A, the triggering arm 15.1 is arranged at a right angle to the rest of the triggering lever 15. The pawl holder 15.2 is formed on the angled triggering arm 15.1, into which a second locking arm 13.2 of the pawl 13 is arranged/plugged. Accordingly, a movement of the triggering lever 15 can be transmitted to the pawl 13, wherein a compact design is simultaneously realized. This movement then allows the first pawl arm 13.1 to be lifted from the rotary latch or the locking element.

FIG. 2B shows the actuating mechanism 18.1, 19, 15 and the pawl 13 from a further perspective. The compact design can also be seen here. As already mentioned, this is the product in particular of the connection geometry and the interlocking of the pawl 13, the triggering lever 15, and the actuation lever 19 thus achieved, among other things, along the shared axis of rotation R. In the embodiment shown, the pawl 13 is arranged with the second pawl arm 13.2 in the pawl holder 15.2 of the triggering arm 15.1 of the triggering lever 15. The pawl arm 13.2 is held in the pawl holder 15.2, at least in portions, with a positive or non-positive fit. For this purpose, crimping ribs which fix an extension of the pawl arm 13.2 are realized in the pawl holder 15.2 of the triggering lever 15. The pawl 13 is thus arranged without play in the pawl holder 15.2, and the movement of the triggering lever 15 causes a movement of the pawl 13.

The triggering lever 15 is preloaded by means of a triggering lever spring 15.3, wherein the spring 15.3 preferably preloads the triggering lever 15 and thus the pawl 13 in the direction of the rotary latch. For this purpose, the triggering lever spring 15.3 is designed as a double leg spring, and is mounted with one leg on the triggering lever 15.1, and mounted with a further leg on the lock housing or the lock case.

FIG. 2B furthermore shows a bearing pin receptacle 13.4, wherein the bearing pin 27 is accommodated therein, so that the pawl 13 can rotate about it. Furthermore, the pawl 13 has buffer pockets 13.5. The buffer pockets 13.5 serve as stop buffers for contact with the rotary latch and/or the lock housing or lock case.

FIG. 3A shows the actuation lever 19 in detail. It has a U-shape. The U-shape makes it possible for the actuation lever 19 to surround the worm gear 18.1 at least in regions at least with its actuating arm 19.1, as a result of which the compact design is further optimized. Accordingly, the recess 22 can be arranged on one side of the worm wheel, and the contact surface 19.2 can be arranged on the other side of the worm wheel, on which the ramp-shaped contour is formed.

At the one end of the actuating arm 19.1, the recess 22 and thus the receptacle for the toothing of the triggering lever are arranged, wherein the contact surface 19.2 for an interaction with the worm gear 18.1—in particular, the contour of the worm gear 18.1—is arranged on the other end of the actuating arm 19.1. The recess 22 is designed here as a receiving geometry for the external toothing of the triggering lever. Consequently, the recess 22 has several indentations for a multi-tooth geometry. In the present case, it is thus such that the negative shape of the flanks of the external toothing of the one connection geometry on the triggering lever corresponds to the flank shape of the internally toothed actuation lever 19, and thus of the connection geometry of the further component. The actuation lever 19 and the triggering lever 15 can thus mesh due to the complementarily designed connection geometry 20, so that a movement of the actuation lever 19 can be transmitted to the triggering lever 15. It can also be seen that a poka-yoke recess 22.1 is provided, so that incorrect assembly/incorrect plugging together of the triggering lever 15 and actuation lever 19 is prevented. The poka-yoke recess 22.1 is designed overall to be larger/wider than the remaining recesses/indentations of the recess contour 22. A wider tooth on the triggering lever—the poka-yoke tooth—can consequently be plugged only into the poka-yoke recess 22.1. Incorrect assembly is thus ruled out. Furthermore, the actuation lever has material recesses, such that the weight of the lever 19 can be reduced. In order to simultaneously provide sufficient mechanical stability, the actuation lever 19 has reinforcing/stiffening ribs 19.4 in the region of the actuating arm 19.1.

FIG. 3B shows the triggering lever 15 according to a preferred embodiment according to the invention. The triggering lever 15 has a triggering arm 15.1, which is arranged substantially at an angle, and preferably at a right angle, to the remaining triggering lever 15. The triggering arm 15.1 has a pawl holder 15.2 in which the pawl is preferably arranged/accommodated without play. In the region of the axis of the triggering lever 15, the external toothing 24 is designed for the shared connection geometry of at least the actuation lever and the triggering lever 15. The external toothing is designed as a multi-tooth geometry and in the embodiment shown has a poka-yoke tooth 24.1. The toothing 24 can be referred to as a plug shaft and can be inserted into the corresponding recess in the actuation lever. Consequently, the actuation lever 19 and the triggering lever 15 engage into one another by means of a complementarily designed connection geometry 20, so that a movement of the actuation lever 19 can be transmitted to the triggering lever 15.

A collar 23, which can serve, for example, as a spring seat for the triggering lever spring, is formed around the external toothing 24 or the plug shaft formed therewith. The triggering lever 15 furthermore has a substantially plate-shaped connection portion 25. The external toothing 24/plug shaft extends on the one side of the connection portion 25, wherein a mounting point 26 is formed on the other side of the connection portion 25. At this mounting point 26, for example, a bearing pin of the pawl can be received at least in portions. This also has a positive influence on the compact design. In the inserted state, the collar 23 surrounds the connection geometry of the triggering lever 15 and actuation lever 19. For example, tilting/inclination of the two levers 15, 19 can thus be prevented, and the penetration of disturbing environmental influences can be made more difficult. The cylindrical collar 23 of the triggering lever thus surrounds or covers in particular a likewise cylindrical portion of the recess 22 on the actuation lever 19. The toothed connection geometry of the triggering lever and actuation lever is thus overall surrounded/encased, and thus imparts more stability and protection against external environmental influences.

FIG. 3C shows the pawl 13 in detail. The pawl 13 has two pawl arms 13.1, 13.2, wherein a first pawl arm 13.1 has a latch surface 13.3 for latching with the rotary latch 12, and wherein a second pawl arm 13.2 can be arranged at least in portions in the triggering lever 15. The two pawl arms 13.1, 13.2 extend radially from the bearing receptacle 13.4 in substantially opposite directions. In addition to the buffer pockets 13.5 already mentioned, the pawl 13 has at least one actuating contour 13.6 for a switch or sensor. An extension can be seen at the end of the second pawl arm 13.2, which extension can be inserted into the pawl holder of the triggering lever.

FIG. 4 shows an embodiment of a motor vehicle lock 10 according to the invention, having a lock housing 30 with a wet space 32 and a dry space 31. These are arranged substantially at right angles to one another. The dry space 31 surrounds the greatest part of the actuating mechanism. In fact, the electromotive drive 16 with the electric motor 17 and the transmission stage 18, comprising the worm 18.2 and the worm gear 18.1, are accommodated in the dry space 31. Furthermore, the actuation lever 19 is arranged in the dry space 31 and has an interface to the wet space 32. A seal 19.5 is arranged on the actuation lever 19 and serves to seal the dry space 31 from the wet space 32 in the region of a passage for the triggering or actuation lever 19. The axis of rotation runs through the passage from the dry into the wet space 32. The connection geometry according to the invention is preferably also arranged in the region of the passage and is closed in a sealed manner by means of the seal 19.5.

Essentially, only the locking mechanism 11 and a part of the triggering lever are thus arranged in the wet space 32. Other parts of the actuating mechanism are located in the dry space 31, and are thus protected from disruptive environmental influences. In any case, the compact design in FIG. 4 can be clearly seen, which is achieved by the connection geometry according to the invention and the accordingly achieved meshing of the actuation lever 19 and triggering lever 15, wherein the pawl, triggering lever, and actuation lever are arranged on the same axis of rotation R.

LIST OF REFERENCE NUMBERS

10 Motor vehicle lock
11 Locking mechanism
12 Rotary latch
13 Pawl
13.1 First pawl arm
13.2 Second pawl arm
13.3 Latch surface
13.4 Bearing pin receptacle
13.5 Buffer pocket
13.6 Actuating contour
14 Blocking element
15 Triggering lever
15.1 Triggering arm

15.2 Pawl holder
15.3 Triggering lever spring
16 Electromotive drive unit
17 Electric motor
18 Transmission stage
18.1 Gear wheel/worm wheel
18.2 Worm
18.3 Contour
19 Actuation lever
19.1 Actuating arm
19.2 Contact surface
19.3 Recesses in actuation lever
19.4 Reinforcing ribs in actuation lever
19.5 Seal
20 Connection geometry
21 Toothing
22 Recess
22.1 Poka-yoke recess
23 Collar
24 External toothing
24.1 Poka-yoke tooth
25 Connection portion
26 Mounting point
27 Bearing pin
30 Lock housing
31 Dry space
32 Wet space
40 Lock holder
I Latch position
II Open position
R Axis of rotation

The invention claimed is:

1. A motor vehicle lock-comprising:

a locking mechanism having a rotary latch and a pawl, wherein the rotary latch is latched into at least one latch position by the pawl;

a rotatable triggering lever, wherein the locking mechanism is moved from the at least one latch position into an open position by the triggering lever; and an electromotive drive unit for actuating the triggering lever, wherein the drive unit comprises an electric motor and a transmission stage, and the transmission stage has an actuation lever, wherein the pawl and the triggering lever and the actuation lever are accommodated in the motor vehicle lock so as to be pivotable about a same axis of rotation, and wherein at least the actuation lever and the triggering lever engage with each other by a complementarily designed connection geometry, so that a movement of the actuation lever is transmitted to the triggering lever, and wherein the pawl has a bearing pin, wherein the triggering lever has an external toothing which extends from a first side of a substantially plate-shaped connection portion in a first direction, and wherein a mounting point for the bearing pin of the pawl is formed on the other side of the connection portion relative to the first side such that the mounting point is a receptacle in the triggering lever.

2. The motor vehicle lock according to claim 1, wherein the connection geometry is designed as a toothing, and teeth of the toothing mesh with correspondingly substantially complementarily designed recesses.

3. The motor vehicle lock according to claim 2, wherein the actuation lever or the triggering lever has a collar running at least in portions in a region of the axis of rotation, so that the toothing is covered at least in portions at least when the actuation lever and the triggering lever are in engagement.

4. The motor vehicle lock according to claim 3, further comprising a spring that preloads the triggering lever and/or the actuation lever, wherein the collar comprises a mounting point for the spring.

5. The motor vehicle lock according to claim 4, wherein the spring is a leg spring having a first leg that is supported by a lock housing and a second leg that engages with a receptacle on a triggering arm of the triggering lever, and windings of the spring are arranged on the triggering lever.

6. The motor vehicle lock according to claim 2, wherein the toothing has between one and ten teeth.

7. The motor vehicle lock according to claim 1, wherein the triggering lever has a triggering arm which is brought into engagement with the pawl.

8. The motor vehicle lock according to claim 7, wherein the triggering arm extends radially from athe connection portion.

9. The motor vehicle lock according to claim 7, wherein the triggering arm is arranged at a right angle relative to a remainder of the triggering lever.

10. The motor vehicle lock according to claim 1, wherein the triggering lever has a pawl holder in which the pawl is arranged.

11. The motor vehicle lock according to claim 10, wherein the pawl is arranged in the pawl holder with a positive fit, at least in portions.

12. The motor vehicle lock according to claim 10, wherein the pawl has at least two pawl arms including a first pawl arm that has a latch surface for latching with the rotary latch, and a second pawl arm that is arranged in the triggering lever at least in portions.

13. The motor vehicle lock according to claim 12, wherein the pawl holder has a clip, latching, crimp, or snap connection for the second pawl arm.

14. The motor vehicle lock according to claim 12, wherein the two pawl arms extend radially from the axis of rotation in opposite directions.

15. The motor vehicle lock according to claim 10, wherein the pawl is arranged in the pawl holder with a non-positive fit at least in portions.

16. The motor vehicle lock according to claim 1, wherein the actuation lever has an actuating arm that surrounds and/or covers a portion of the transmission stage.

17. The motor vehicle lock according to claim 16, wherein the actuating arm has a U-shape that surrounds and/or covers a gear wheel of the transmission stage at least in portions.

18. The motor vehicle lock according to claim 1, further comprising at least one seal arranged between the actuation lever and the triggering lever and/or between the triggering lever and the pawl.

19. The motor vehicle lock according to claim 1, further comprising a lock housing that includes a dry space and a wet space separated by a seal, wherein the drive unit is located at least in part in the dry space, and the locking mechanism and triggering lever are located at least in part in the wet space.

20. A motor vehicle lock-comprising:

a locking mechanism having a rotary latch and a pawl, wherein the rotary latch is latched into at least one latch position by the pawl;

a rotatable triggering lever, wherein the locking mechanism is moved from the at least one latch position into an open position by the triggering lever; and an electromotive drive unit for actuating the triggering lever, wherein the drive unit comprises an electric motor and a transmission stage, and the transmission stage has an actuation lever, wherein the pawl and the triggering lever and the actuation lever are accommodated in the motor vehicle lock so as to be pivotable about a same axis of rotation, and wherein at least the actuation lever and the triggering lever engage with each other by a complementarily designed connection geometry, so that a movement of the actuation lever is transmitted to the triggering lever, wherein the actuation lever has an actuating arm that surrounds and/or covers a portion of the transmission stage, and wherein the actuating arm has a U-shape that surrounds and/or covers a gear wheel of the transmission stage at least in portions.

* * * * *